(12) United States Patent
Hogan et al.

(10) Patent No.: US 11,143,616 B2
(45) Date of Patent: Oct. 12, 2021

(54) MOBILE VOLTAMMETRIC ANALYSIS

(71) Applicant: La Trobe University, Bundoora (AU)

(72) Inventors: Conor Hogan, Alphington (AU);
Darrell Elton, Mill Park (AU); Seng Loke, South Morang (AU)

(73) Assignee: LA TROBE UNIVERSITY, Victoria (AU)

( * ) Notice: Subject to any disclaimer, the term of this patent is extended or adjusted under 35 U.S.C. 154(b) by 292 days.

(21) Appl. No.: 16/084,770

(22) PCT Filed: Mar. 16, 2017

(86) PCT No.: PCT/AU2017/050232
§ 371 (c)(1),
(2) Date: Sep. 13, 2018

(87) PCT Pub. No.: WO2017/156584
PCT Pub. Date: Sep. 21, 2017

(65) Prior Publication Data
US 2019/0072513 A1 Mar. 7, 2019

(30) Foreign Application Priority Data
Mar. 18, 2016 (AU) .............................. 2016901027

(51) Int. Cl.
*G01N 27/327* (2006.01)
*G10L 19/008* (2013.01)

(52) U.S. Cl.
CPC ..... *G01N 27/3273* (2013.01); *G01N 27/3274* (2013.01); *G10L 19/008* (2013.01)

(58) Field of Classification Search
CPC ........... G01N 27/3273; G01N 27/3274; G01N 27/42; G01N 27/48; G10L 19/008
See application file for complete search history.

(56) References Cited

U.S. PATENT DOCUMENTS 9,173,600 B2 11/2015 Matsiev et al.
2006/0042960 A1 3/2006 Tice
(Continued)

FOREIGN PATENT DOCUMENTS

| EP | 2569622 A2 | 3/2013 |
|---|---|---|
| WO | 2014-100687 A2 | 6/2014 |
| WO | 2014-110468 A1 | 7/2014 |

OTHER PUBLICATIONS

Broeders et al., IEEE Sensors Journal, vol. 13, Jul. 2013 (Year: 2013).*

(Continued)

*Primary Examiner* — Gurpreet Kaur
(74) *Attorney, Agent, or Firm* — Vorys, Sater, Seymour and Pease LLP; William L. Klima

(57) ABSTRACT

A low-cost voltammetric analysis system using a mobile computing device having a microprocessor, a memory and an audio interface. The audio interface comprises an audio signal output having first and second channels and an audio signal input. The interface is connectible to a voltammetric cell comprising first and second electrodes, and the memory of the device contains instructions which, when executed by the microprocessor, cause the device to: generate an output voltage waveform between the first and second channels of the audio signal output, the output voltage waveform comprising a time-varying voltammetric driving potential and an AC perturbation; simultaneously with generating the output voltage waveform, capture an input voltage waveform received at the audio signal input; and record the input voltage waveform as a voltammetric response waveform within a data store.

12 Claims, 8 Drawing Sheets

(56) References Cited

U.S. PATENT DOCUMENTS

2012/0075242 A1* 3/2012 Hotelling .............. G06F 1/1684
                                                    345/174
2012/0156933 A1   6/2012 Kreger
2015/0127271 A1* 5/2015 Liu .................. G01N 35/00871
                                                    702/32

OTHER PUBLICATIONS

Delaney et al. Analytical Chimica Acta, 790, 2013, 56-60 (Year: 2013).*
ISR/WO for PCT/AU2017/050232 dated Jun. 5, 2017.
Xinhao Wang et al: "Audio jack based miniaturized mobile phone electrochemical sensing platform", Sensors and Actuators B; Chemical, vol. 209, Dec. 12, 2014, pp. 677-685, XP05540783, NL ISSN; 0925-4005, DOI: 10.1016/j.snb.2014/12.017 figures 1,2 p. 677, right-hand column, lines 6-7.
Bond Alan M et al: "An integrated instrumental and theoretical approach to quantitative electrode kinetic studies based on large amplitude Fourier transformed a.c. voltammetry: A mini review", Electrochemistry Communications, Elsevier, Amsterdam, NL, vol. 57, May 8, 2015, pp. 78-83, XP029212452, ISSN: 1388-2481, DOI: 10.1016/J.Elecom.2015.04.17 p. 1.
Supplementary European Search Report for related EP application No. 17765576.8 dated Sep. 20, 2019.

* cited by examiner

MOBILE VOLTAMMETRIC ANALYSIS

FIELD OF THE INVENTION

The present invention relates to electrochemical methods of analysis, and more particularly to a low-cost voltammetric analysis system using widely available mobile computing technology.

BACKGROUND TO THE INVENTION

Recent trends in the field of chemical sensors and biosensors have highlighted the importance of simplicity and low cost in determining whether sensing technologies have the capacity to be transformative to the lives of ordinary people, and available to those in remote or resource-poor environments. To this end, there has been considerable interest in the use of low-cost materials, such as paper, and low-cost fabrication techniques, such as printing, to produce microfluidic sensors which can be manufactured at minimal expense. A further area of interest has been reduction of the cost of detection instruments by, for example, the use of printed electronics co-located on disposable sensors.

One approach that has generated some interest is to employ mobile computing devices, such as smartphones or tablets, as components in sensing arrangements. Such devices have now reached market saturation in the developed world, and are rapidly becoming ubiquitous also in the developing world.

Through the use of mobile computing devices, costs can be reduced because the device may replace many back-end sensor functions, such as user interaction, data acquisition, signal processing and results display. Moreover, the connectivity of these devices holds the promise of facilitating telemedicine and helping to eliminate distance barriers, thereby improving access to medical services in remote and resource-poor communities.

However, most of the applications of mobile device technology for chemical sensing and/or bio-sensing have relied upon external active peripheral devices in order to perform key sensor functions. While such solutions provide a cost benefit over more expensive integrated sensing apparatus, they nonetheless involve additional costs over and above the availability of a suitable mobile device, as well as the inconvenience of carrying the additional peripheral sensing apparatus.

Accordingly, there remains an ongoing need to develop further low-cost sensing systems, and to extend the availability of chemical sensors and biosensors within remote communities and less-developed nations. The present invention seeks to address this ongoing need, or at least to provide a useful alternative to existing low-cost sensing systems.

SUMMARY OF THE INVENTION

In one aspect the present invention provides a mobile computing device comprising:
 a microprocessor;
 one or more memory components comprising a program and data store accessible to the microprocessor;
 an audio interface comprising an audio signal output having first and second channels and an audio signal input, which is operable under control of the microprocessor, wherein the audio interface is connectible, in use, to a voltammetric cell comprising first and second electrodes, the first channel of the audio signal output being connected to the first electrode, the second channel of the audio signal output being connected to the second electrode via a resistor, and the audio signal input being connected to the second electrode via a capacitor; and
 the program and data store containing instructions which, when executed by the microprocessor, cause the mobile computing device to implement steps of:
  generating an output voltage waveform between the first and second channels of the audio signal output, the output voltage waveform comprising a time-varying voltammetric driving potential and an AC perturbation;
  simultaneously with generating the output voltage waveform, capturing an input voltage waveform received at the audio signal input; and
  recording the input voltage waveform as a voltammetric response waveform within the data store.

In particular, the mobile computing device may be a mobile phone, a smart phone, a tablet, or similar. The audio interface is thus an inbuilt feature of the mobile computing device, and requires no additional external active peripheral sensing apparatus. In particular, investigations conducted by the present inventors have established that, by using the audio output of the headset port of a mobile device to apply the driving voltage waveform, and the microphone input line of the same port to measure the current (as a voltage across the resistor), a voltammogram can be produced which remarkably resembles the results obtained using a conventional potentiostat.

According to embodiments of the invention, the instructions cause the mobile computing device to generate the output voltage waveform by:
 generating a first waveform comprising the voltammetric driving waveform;
 generating a second waveform comprising an inverse of the voltammetric driving waveform;
 superimposing the AC perturbation to one of the first and second waveforms; and
 applying the first waveform to the first channel of the audio signal output, and the second waveform to the second channel of the audio signal output.

Advantageously, generating opposing outputs on the first and second channels (e.g. left and right channels of a standard stereo output) the available peak potential is effectively doubled. For example, each channel of a conventional audio output interface may provide for peak-to-peak waveforms of up to 0.7 volts, such that driving the two channels in opposition makes a peak-to-peak potential of 1.4 volts available.

According to embodiments of the invention, the instructions cause the mobile computing device to generate the output voltage waveform in which the voltammetric driving potential is a triangle wave.

In embodiments of the invention, the executable program instructions may take the form of an app, which may be downloaded and installed on the mobile computing device. Driving of the audio output, and capture of the audio input, may be achieved programmatically using standard application programming interfaces (APIs) provided by the relevant operating system, such as iOS, Android or Windows. Input and output via the mobile device may also advantageously be implemented using available APIs. Significantly, no additional hardware and/or operating system support is required in order to implement the required programming on a wide range of commercially available mobile computing devices.

The inventor's investigations have further revealed that a number of performance trade-offs can be controlled via selection of the resistor value, and/or parameters of the superimposed AC perturbation, such as its amplitude and frequency. For example, increasing the resistor value improves sensitivity, but reduces linear dynamic range of the sensing function. Increasing frequency of the AC perturbation improves performance, up to a point, while increasing amplitude also increases sensitivity. However, this is not entirely beneficial, because increased voltammetric current response also increases ohmic effects, and impacts on linearity and dynamic range.

While electrode size and geometry also impacts performance, these will not always be within the control of a user. On the other hand, varying the resistor value (e.g. through the use of a potentiometer) and/or the frequency and amplitude of the AC perturbation (under software control) is relatively straightforward.

According to various embodiments of the invention the resistor has a value in the range 47Ω to 4.7 kΩ, more particularly in the range 68Ω to 390Ω, and more particularly around 100Ω.

In embodiments of the invention a frequency of the AC perturbation is in the range 50 Hz to 500 Hz, more particularly in the range 100 Hz to 400 Hz, and more particularly in the range of around 200 Hz to around 300 Hz. It is desirable, however, to avoid mains pickup, which typically occurs at around 50 Hz, or 60 Hz, depending upon the country. According to embodiments of the invention, therefore, the frequency of the AC perturbation is not 50 Hz, or any multiple of 50 Hz, and/or is not 60 Hz, or any multiple of 60 Hz.

In embodiments of the invention, an amplitude of the AC perturbation, relative to a peak output voltage, is in the range 0.7 percent to 7 percent, and more particularly around 3 percent to around 5 percent.

Embodiments of the invention also provide a method of AC voltammetric analysis of an analyte in a voltammetric cell, the method comprising:

connecting, to the voltammetric cell, a mobile computing device as described above, wherein the first channel of the audio signal output is connected to a first electrode of the voltammetric cell, the second channel of the audio signal output is connected to a second electrode of the voltammetric cell via the resistor, and the audio signal input is connected to the second electrode of the voltammetric cell via the capacitor;

the mobile computing device acquiring a voltammetric response waveform; and performing a second harmonic analysis of the voltammetric response waveform to obtain a corresponding voltammogram.

In embodiments of the invention, performing the second harmonic analysis comprises filtering a second harmonic waveform from the AC perturbation, and obtaining the voltammogram as an envelope of the filtered second harmonic waveform. The filtering may conveniently be performed by computing a frequency transform of the voltammetric response waveform, extracting frequency components of the transformed waveform corresponding with the second harmonic frequency, and performing an inverse frequency transform on the extracted signal.

Further aspects, features and advantages of the invention will be apparent from the following description of particular embodiments, which is provided, by way of example only, to assist the skilled person in understanding the principles of the invention, and putting those principles into effect. The disclosed embodiments are not intended to be limiting of the scope of the invention, as described in the foregoing statements, or as defined in the claims appended hereto.

BRIEF DESCRIPTION OF THE DRAWINGS

Embodiments of the invention will be described with reference to the accompanying drawings, in which like reference numerals refer to like features, and wherein.

DESCRIPTION OF EMBODIMENTS

Figure 1:
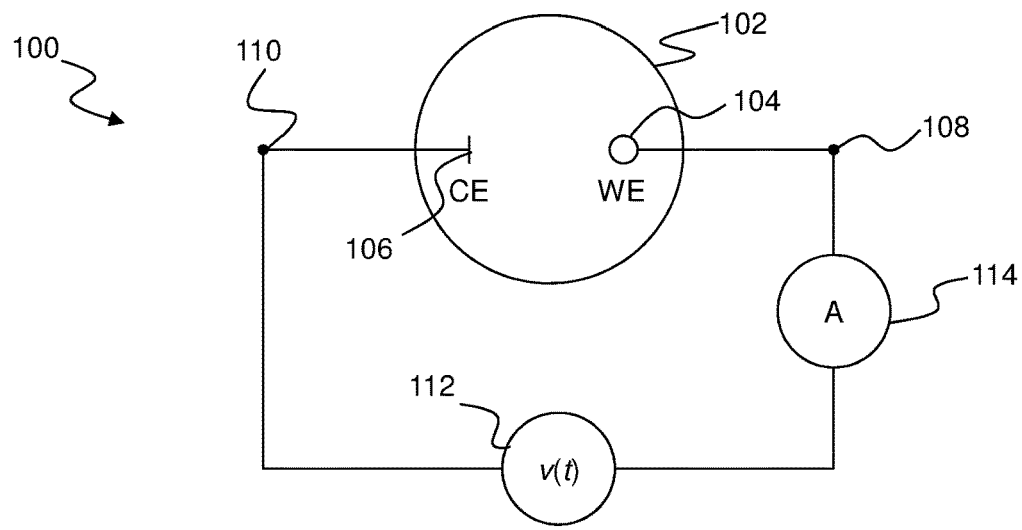
FIG. 1 illustrates a conventional two-electrode potentiostat configuration.

FIG. 1 illustrates schematically a conventional two-electrode potentiostat configuration 100. A voltammetric cell 102 is provided, which contains an analyte solution. Immersed in the analyte solution are a working electrode (WE) 104, and a counter electrode (CE) 106. The WE and CE have corresponding terminals 108, 110. A time-varying potential is applied between the WE and CE by a voltage/signal source 112. A resulting time-varying current within the circuit is measured, e.g. by an ammeter 114.

The time-varying potential applied to the WE drives oxidation and/or reduction of the analyte. Various forms of voltammetry, in which the resulting current is analysed, are able to provide sensitive quantitative information from the magnitude of the current peak, as well as a degree of selectivity based upon the potential axis of a voltammogram. A further advantage of voltammetry is the great diversity of specialised sub-techniques available, each defined by the nature of the excitation signal which is applied to the WE, i.e. almost anything from a triangular waveform to a complex series of incremented pulses.

One particular variety of voltammetry employed in embodiments of the present invention, is second harmonic AC voltammetry. According to this technique, an AC perturbation superimposed on a more slowly time-varying driving potential is applied to the WE. The resultant current signal is processed to extract a second harmonic corresponding with the AC perturbation frequency, which has the advantage that the second harmonic signal is relatively free of capacitive background current.

A further property of second harmonic AC voltammetry is that it does not require the capture or recording of any DC component of the current waveform. Embodiments of the present invention take advantage of this property to enable a mobile computing device having a standard audio interface (i.e. first and second stereo output channels, and a microphone input channel) to be programmed in software to act as a potentiostat suitable for connection to a voltammetric cell 102 in a two-electrode configuration. Standard audio inputs, including microphone inputs, are almost invariably AC-coupled, considering that capture of frequencies below the audible range provides no value, and that DC-coupled inputs are susceptible to static accumulation, noise and drift.

Figure 2:
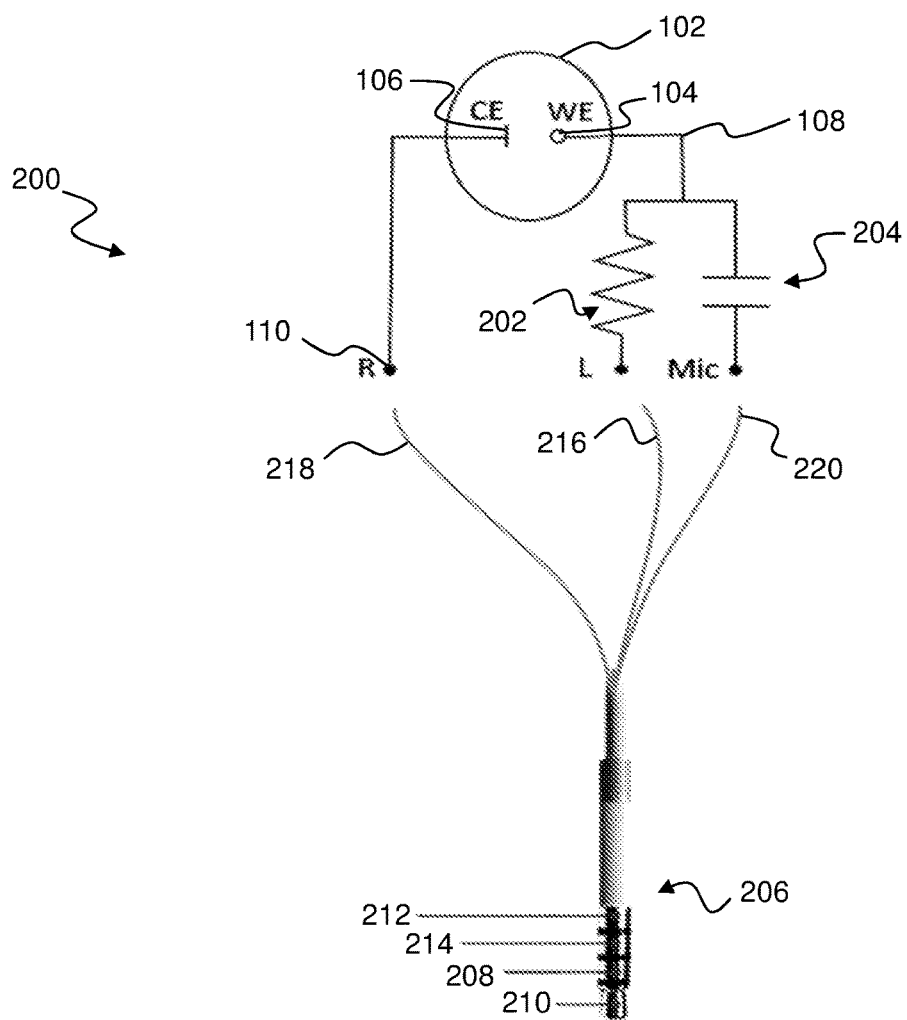
FIG. 2 illustrates a configuration for connecting the audio interface of a mobile computing device to a voltammetric cell embodying the invention.

FIG. 2 illustrates schematically a configuration 200 for connecting the audio interface of a standard mobile computing device to a voltammetric cell embodying the invention. The configuration 200 comprises the standard two-electrode voltammetric cell 102 with WE 104 and CE 106. A resistor 202 and capacitor 204 are connected to the terminal 108 associated with the WE 104. A cable is provided having a conventional four-conductor TRRS (tip-ring-ring-sleeve) 3.5 mm audio jack (CTIA pinout) 206. When connected to a corresponding audio socket of a mobile computing device, the first ring 208 contacts the first (right) channel output, the tip 210 contacts the second (left) channel, the sleeve 212 contacts the microphone input conductor, and the second ring 214 is a ground or common connection.

In the configuration 200 the first output channel is connected 218 to the terminal 110 of the voltammetric cell 102. The second output channel is connected 216 to the open end of the resistor 202, and the audio input (microphone) channel is connected 220 to the open end of the capacitor 204.

Under software control, it is thereby possible to generate an excitation potential waveform between the first and second audio signal outputs of a mobile computing device. It is also simultaneously possible to receive a resulting time-varying voltage signal at the audio signal input, and to capture this input voltage waveform under software control.

In particular, an output voltage waveform may be generated between the first and second channels of the audio signal output of a suitable mobile computing device, which comprises a time-varying voltammetric driving potential (such as a ramp or triangle wave) combined with an AC perturbation signal. More particularly, the mobile computing device may be programmed to generate a first waveform for output on the first channel and a second waveform for output on the second channel, where the first and second waveforms are inverse to one another, such that the total potential available to be applied between the first and second channel outputs is effectively double the peak voltage output available at each channel individually. Furthermore, the AC perturbation may be superimposed on either one of the first and second waveforms. For example, in embodiments of the invention the AC perturbation is superimposed on the first waveform and applied to the CE 106 directly. Alternatively, the AC perturbation may be superimposed on the second waveform, and applied to the WE 104 via the resistor 202. The resulting current, which flows in the circuit via the voltammetric cell 102, generates a voltage across the resistor 202 which has AC components that can be received and captured by the audio signal input of the mobile computing device.

Figure 3A:
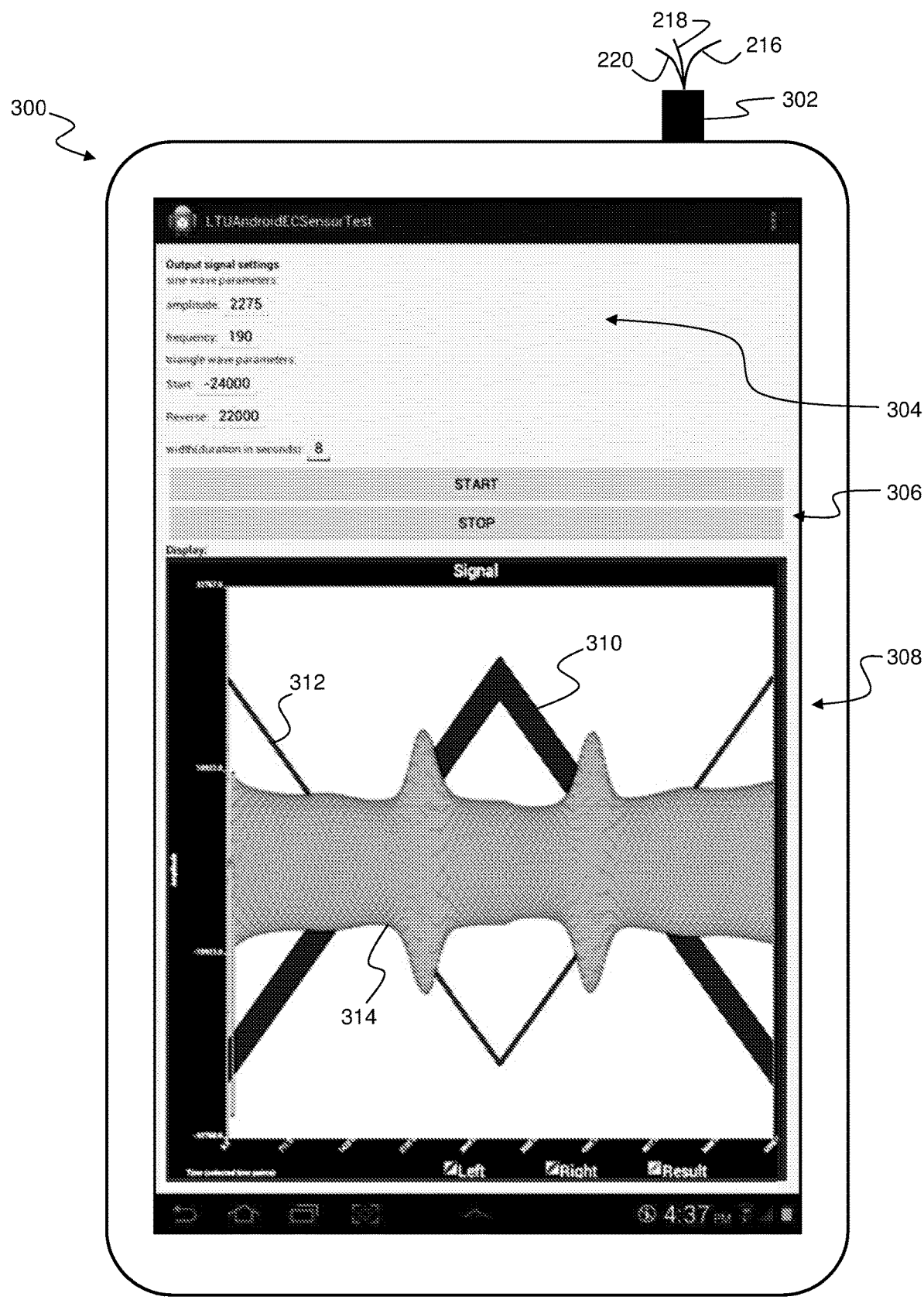
FIGS. 3A and 3B illustrate a voltammetry app executing on a mobile computing device.

FIG. 3A illustrates an exemplary user interface of a voltammetry app executing on a mobile computing device 300. The device 300 has a socket 302, to which the jack 206 can be fitted. The app interface has a parameter input region 304, via which the user is able to enter measurement parameters in a conventional manner, by interacting with the touchscreen display of the mobile computing device. Such parameters may include properties of the underlying time-varying voltammetric driving potential, such as triangle wave timing parameters, as well as properties of the superimposed AC perturbation, such as amplitude and frequency.

Input buttons 306 enable the user to interact with the app to start and stop measurements.

A waveform display region 308 shows both output and input waveforms. As shown, the second channel output 310 comprises a positive-going triangle wave upon which an AC perturbation has been superimposed. The first channel output 312 comprises a complementary negative-going triangle wave. The resulting signal received at the audio signal input of the mobile computing device 300 is shown as the trace 314. The user is thereby able to monitor progress of a measurement as it occurs.

Figure 3B:
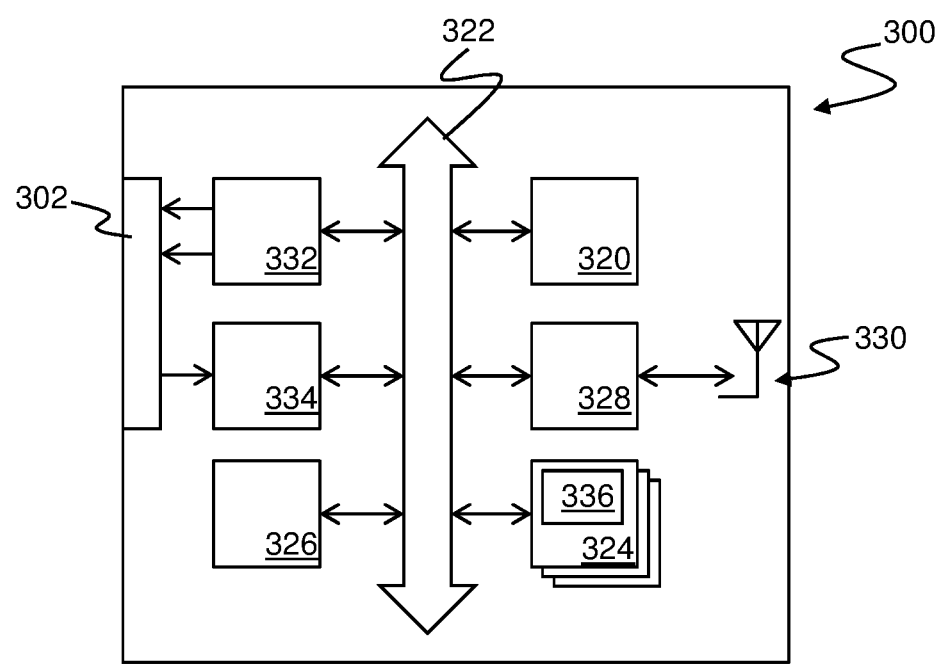

FIG. 3B is block diagram showing schematically a number of exemplary components within the mobile computing device 300. The exemplary device 300 comprises a microprocessor 320 which is connected to a number of integrated peripherals via one or more data, address, communications and/or signalling buses 322. In particular, one or more memory components 324 are accessible to the microprocessor 320, and comprise a store for programs and data which may be executed or processed by the microprocessor 320. Also integrated in the exemplary mobile device 300 is at least one network interface 328, such as a cellular mobile telephone interface and/or a Wi-Fi interface, which the device 300 may use for communication with remote systems. An antenna 330 further facilitates wireless communications.

The device 300 further includes stereo audio output 332 and audio input 334 interfaces. The audio output 332 itself comprises the necessary buffering, timing, and digital-to-analog conversion functionality required to convert digital signal waveforms received from the microprocessor 320 into two-channel analog output signals at the audio socket 302.

Similarly, the audio input interface 334 comprises the necessary timing, buffering and analog-to-digital conversion functions required to capture an analog input signal received from the audio socket 302, convert the received signal into an equivalent digital waveform, and buffer received values for transfer to memory 324 and/or retrieval by the microprocessor 320.

The memory components 324 may comprise different types of memory elements, such as volatile memory (e.g. random access memory), and non-volatile memory, such as flash memory, other forms of solid-state memory, and/or magnetic storage devices such as a hard disk drive. In addition to containing program code and data relevant to the general operation of the mobile computing device 300 (e.g. programs and data associated with an operating system, such as the Android or Apple iOS operating systems), the memory 324 further contains program instructions and associated data 336, comprising an application (or 'app') implementing functionality embodying the invention, including providing a user interface such as is illustrated in FIG. 3A, and the further functionality described below, particularly with reference to FIG. 4.

The mobile computing device 300 also includes a touchscreen interface 326, enabling the above-described interactions (i.e. input and output) with a user.

Figure 4:
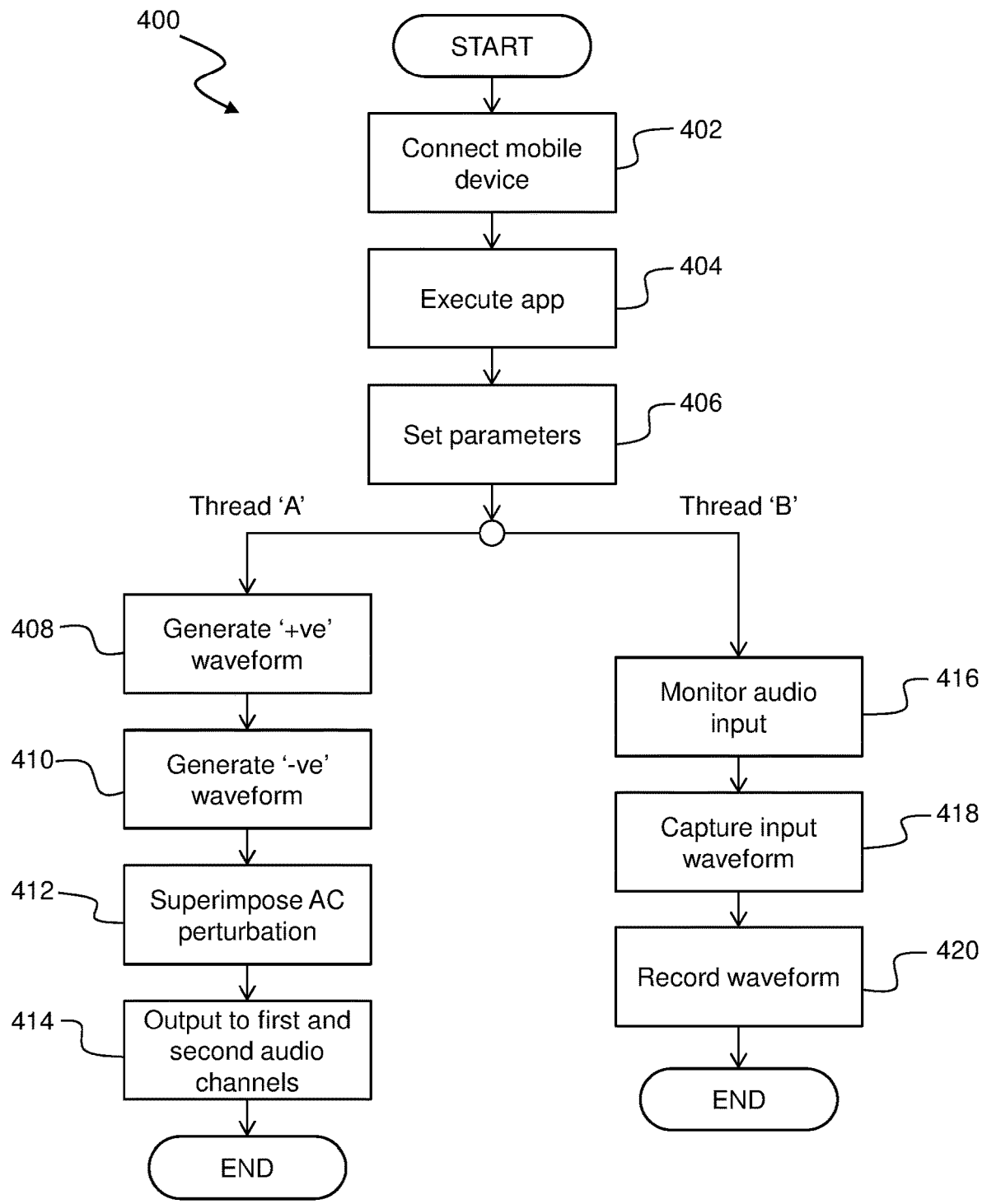
FIG. 4 is a flowchart illustrating a voltammetric measurement procedure embodying the invention.

FIG. 4 is a flowchart 400 illustrating a voltammetric measurement procedure embodying the invention. Initial manual steps comprise connecting 402 the mobile device 300 to the voltammetric cell, e.g. in the configuration 200 illustrated in FIG. 2, executing 404 the voltammetric measurement app, and setting 406 measurement parameters via interaction with a relevant portion of the user interface 304.

Once the configuration is set correctly, the user interacts with the touchscreen buttons 306 to commence the measurement. At this point the app executes in two parallel threads. In thread A the excitation potential waveforms are generated and output to the voltammetric cell. In thread B the audio signal input is monitored to capture the resulting output signal. As illustrated in the flowchart 400, the operations of thread A comprise generating 408 a positive-going waveform, generating 410 a negative-going waveform, superimposing 412 an AC perturbation on at least one of the waveforms, e.g. the positive-going waveform generated at step 408 and outputting 414 the pair of waveforms to the first and second audio channels via the device audio output interface 332. As will be appreciated, the separate steps 408, 410 412, 414 are illustrated by way of example only. The waveforms may, in practice, be generated in any sequence and in particular may be generated substantially simultaneously, and continuously, for output over the course of the measurement.

Meanwhile, and simultaneously within thread B, the audio input channel is monitored 416, and the input waveform is captured 418. Finally, the input voltage waveform is recorded 420 as a voltammetric response waveform within the data store 324 of the mobile device 300. Recording of the waveform into memory may be performed in a number of equivalent ways, e.g. continuously or periodically during the course of a measurement, or as a separate step following completion of the measurement.

In any event, following completion of a measurement a digital representation of a voltammetric response waveform, e.g. waveform 314, has been captured and recorded into memory 324 of the mobile device 300.

Figure 5:
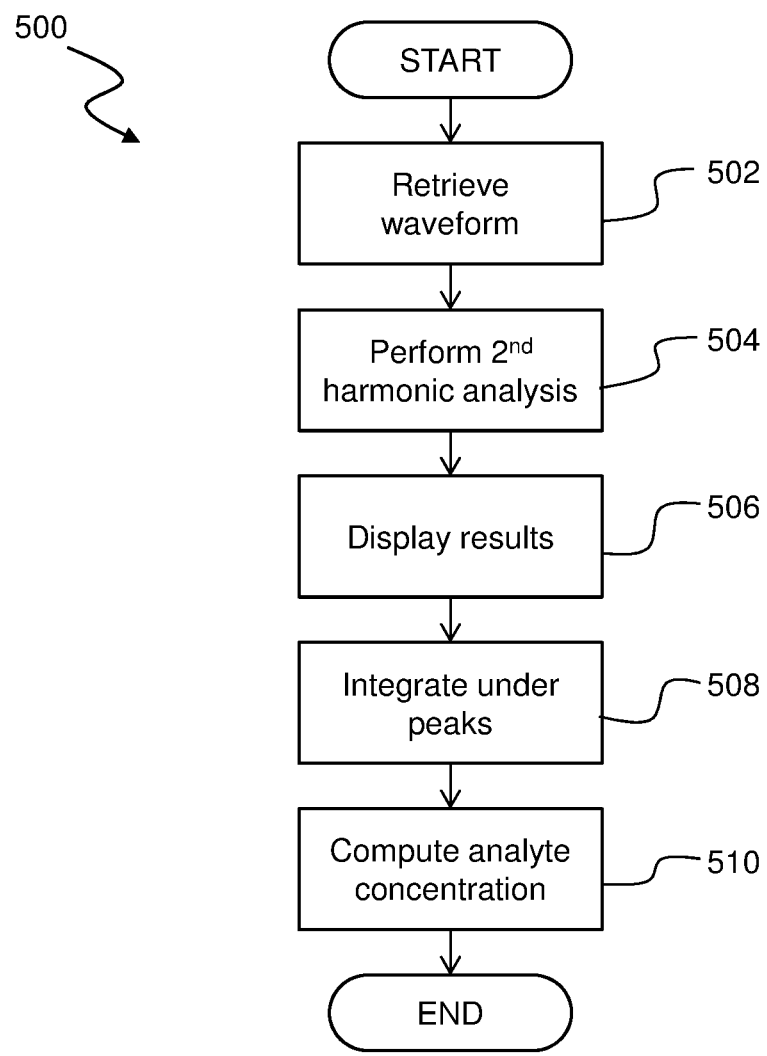
FIG. 5 is a flowchart illustrating a method of data analysis embodying the invention.

Turning now to FIG. 5, there is shown a flowchart 500 illustrating a method of data analysis of the recorded waveform embodying the invention. The data analysis may be performed on the mobile device 300, via additional analysis functionality provided within the app, or the waveform data may be transferred to another device, such as a desktop computer, laptop computer, or cloud-based server, for further analysis.

At step 502 the recorded wave form is retrieved. At step 504 a second harmonic analysis is performed. The second harmonic analysis 504 results in a waveform that is characteristic of the oxidation and/or reduction of the analyte within the voltammetric cell 102. Further steps in the data analysis 500 may be optionally performed or omitted in various embodiments of the invention.

For example, at step 506 the results of the second harmonic analysis may be displayed. Alternatively, or additionally, a further analysis step 508 provides for integration of the area under the peaks of the waveform resulting from the second harmonic analysis. These 'integrated peaks' (IP) are generally correlated with the analyte concentration. Accordingly, in a further step 510, the analyte concentration corresponding with the IP value may be computed. The computation 510 of analyte concentration may involve accessing calibration data in order to apply a predetermined relationship between IP values and analyte concentration. Examples of calibration data are discussed in greater detail below with reference to FIGS. 8A and 8B.

Figure 6:
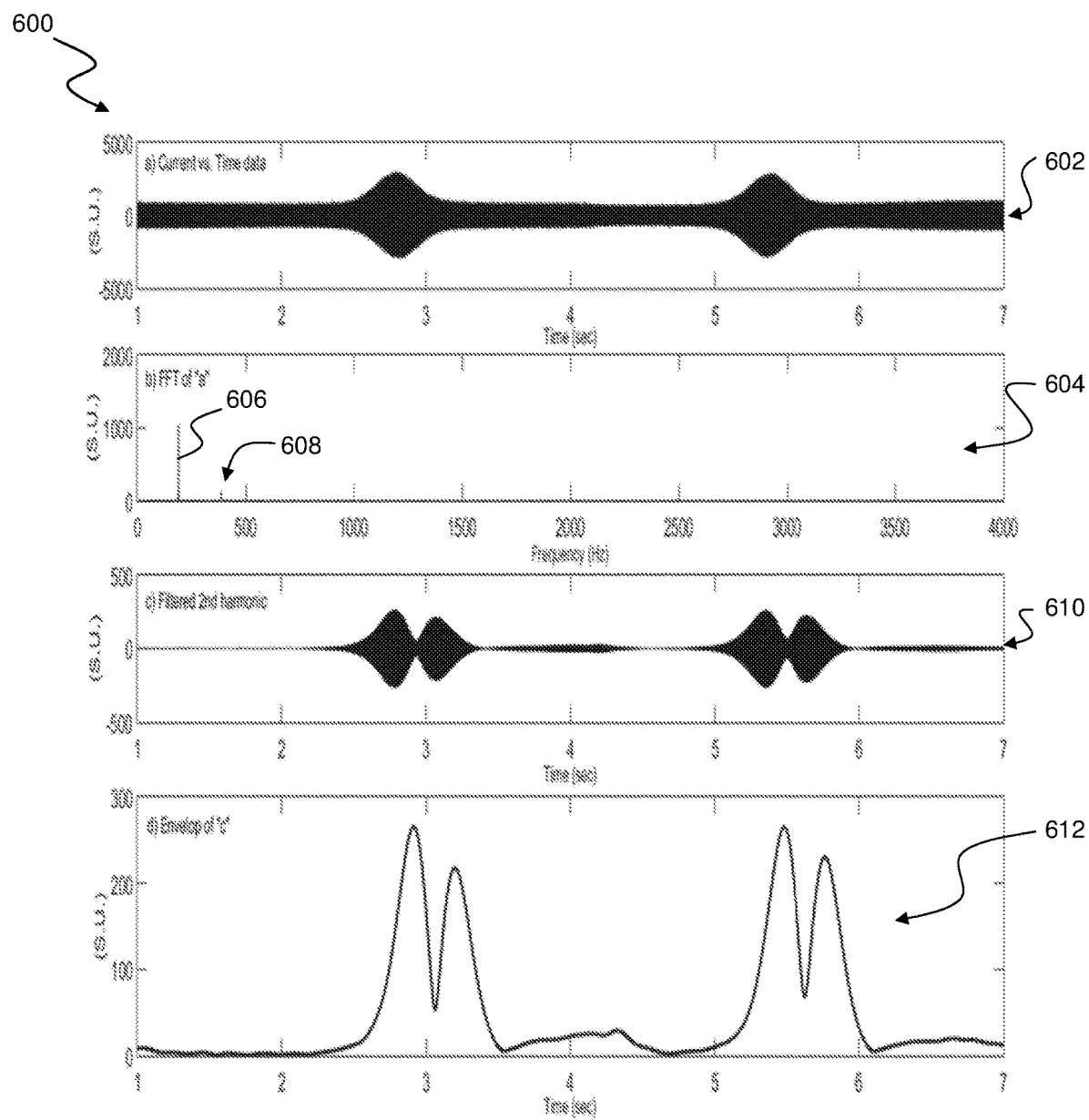
FIG. 6 shows exemplary results of measurement and analysis according to the procedures of FIGS. 4 and 5.

FIG. 6 shows exemplary results 600 of measurement and analysis according to the processes illustrated in FIGS. 4 and 5. The graph 602 illustrates an exemplary measured/retrieved waveform. The graph 604 is a corresponding frequency spectrum, obtained by performing a discrete Fourier transform (e.g. via the fast Fourier transform algorithm) of the retrieved waveform 602. A peak 606 corresponding with the superimposed AC perturbation (fundamental) is clearly visible. A substantially smaller peak 608 is associated with the second harmonic.

According to the second harmonic analysis process, components of the signal around the second harmonic peak 608 are extracted, and an inverse transform applied to obtain a corresponding second harmonic time-domain waveform 610. A final voltammogram waveform 612 is produced by determining the envelope of the second harmonic waveform 610. As has been noted above, significant useful information regarding the analyte may be determined from the peaks of the voltammogram waveform 612, and in particular the integral of the waveform (i.e. IP value) is known to be correlated with analyte concentration.

As will be appreciated from the foregoing description, a number of parameters of the voltammetric measurement configuration may be varied, for example in order to improve or optimise the results for particular purposes. Parameters that may be varied in software include the form, timing and duration of the underlying time-varying voltammetric driving potential, and the amplitude and frequency of the superimposed AC perturbation. Characteristics of the physical configuration 200 that may be subject to variation include the dimensions and composition of the electrodes 104, 106, as well as values of the resistor 202 and capacitor 204. As a practical matter, characteristics of the voltammetric cell 102 will typically be limited by availability. However, in some embodiments it may be practical to provide the user with control over the value of the resistor 202 and/or the capacitor 204, for example by an arrangement of switchable components, or by the use of variable components, such as a potentiometer in place of the resistor 202.

Figure 7:
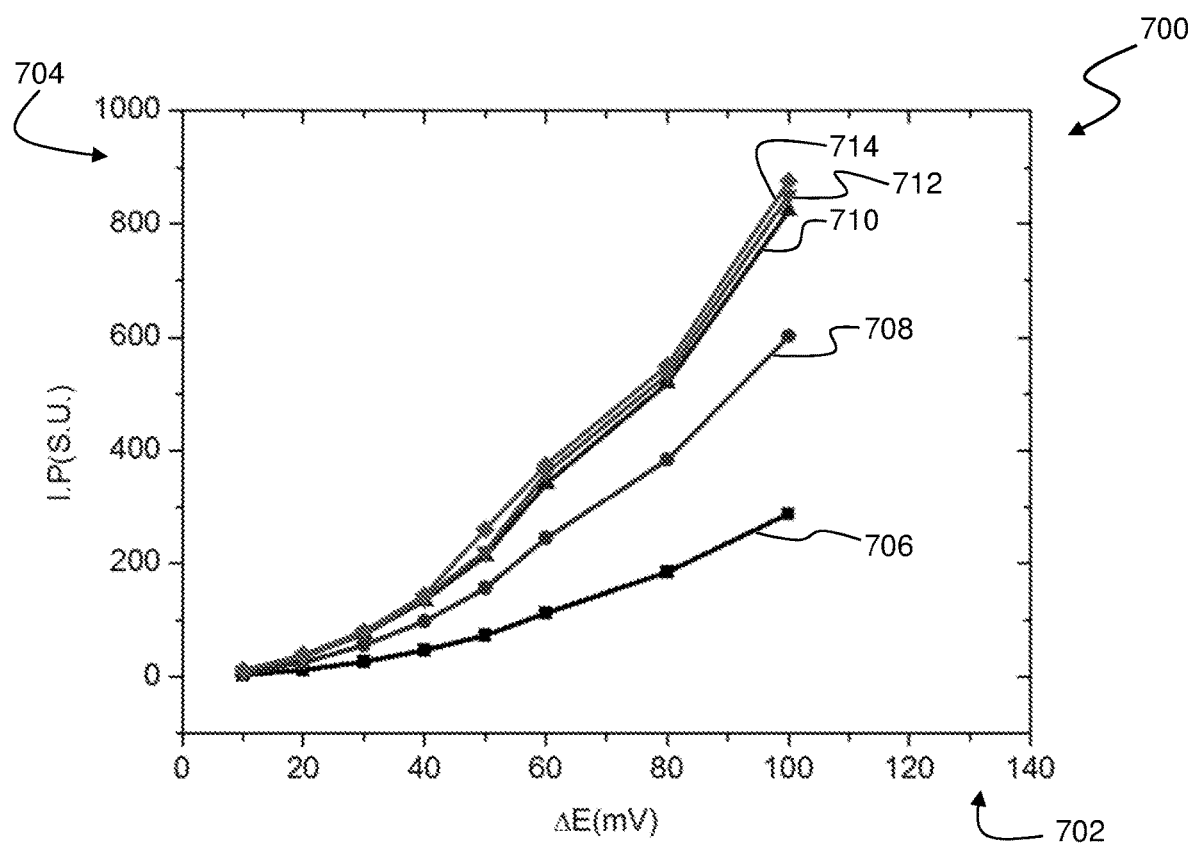
FIG. 7 is a graph illustrating sensitivity of measurement as a function of AC amplitude and frequency according to embodiments of the invention.

FIG. 7 shows a graph 700 illustrating the sensitivity of measurement as a function of AC perturbation amplitude and frequency. The horizontal axis 702 represents amplitude of the perturbation in millivolts, while the vertical axis 704 shows computed values of IP in arbitrary units. A number of sets of results are shown, each corresponding with a different frequency of AC perturbation. The curve 706 shows IP as a function of AC amplitude for a frequency of 90 Hz, curve 708 shows equivalent results for a frequency of 190 Hz, and curves 710, 712, 714 show further results for frequencies of 290 Hz, 390 Hz, and 490 Hz respectively.

The results in FIG. 7 generally indicate that higher values of AC amplitude provide higher sensitivity, i.e. higher values of IP and, accordingly, greater signal-to-noise ratio. This is unsurprising, since a higher fundamental amplitude results in a higher second harmonic amplitude, and accordingly larger pulses within the final voltammogram. In practice, however, it is not possible to increase AC perturbation amplitude indefinitely. Higher AC amplitude limits the voltage range available for the underlying time-varying voltammetric driving potential waveform, and increases the parasitic effect of the resistor 202 within the voltammetric circuit. It is therefore desirable to place a reasonable limit on the modulation depth of the AC perturbation. The results shown in the graph 700, for example, correspond with a relative amplitude, compared with a full-scale voltage of 1.4 V, of between about 0.7 percent and about 7 percent.

It can also be observed in the graph 700 that lower AC perturbation frequencies result in lower sensitivity, i.e. smaller values of IP. There is, for example, a notable reduction in output for AC perturbation frequencies of 90 Hz and 190 Hz. However, for the higher frequencies of 290 Hz, 390 Hz and 490 Hz minimal further improvement is observed. This is explained in part by the frequency response of the audio input in combination with the RC network consisting of the resistor 202 and capacitor 204, and in part by a square-root relationship between the AC perturbation frequency and IP.

A further consideration in relation to frequency selection is to minimise interference from readily anticipated external electromagnetic fields. At the frequencies of interest, these are primarily generated by mains power supplies, which typically operate at either 50 Hz or 60 Hz. It is therefore desirable to avoid AC perturbation at these frequencies, and at integer multiples of these frequencies, at which higher harmonics may arise.

Figure 8A:
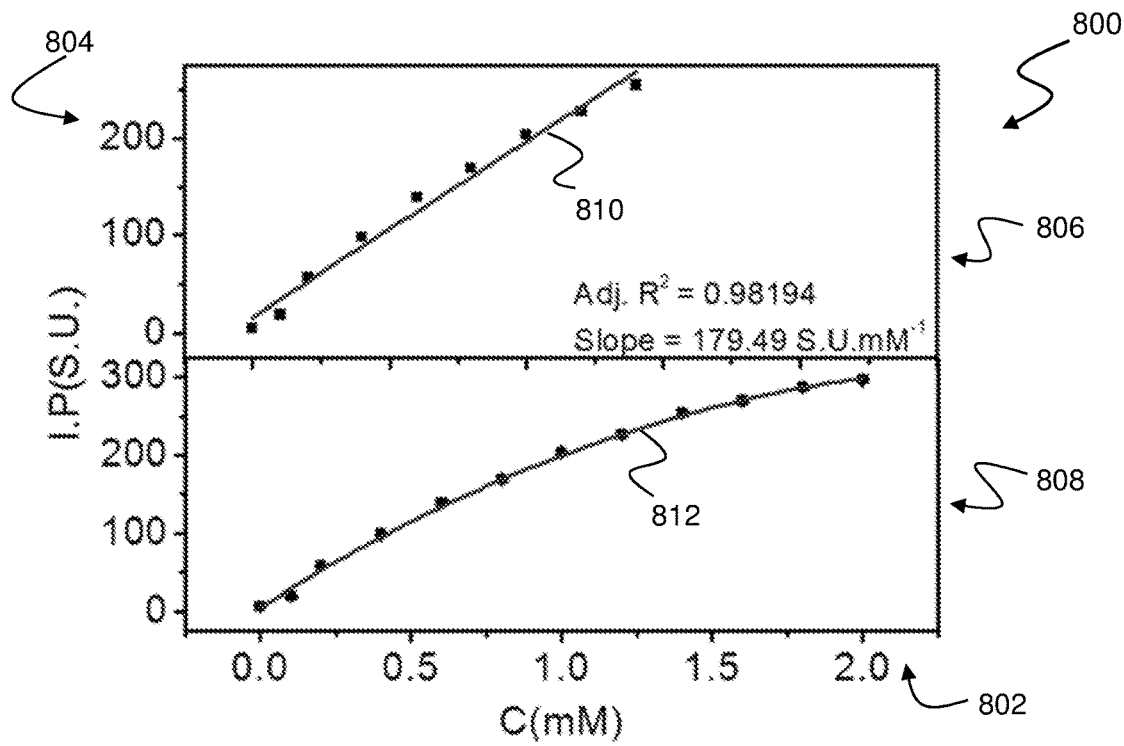
FIGS. 8A and 8B are calibration plots for different resistor values according to embodiments of the invention.
Figure 8B:
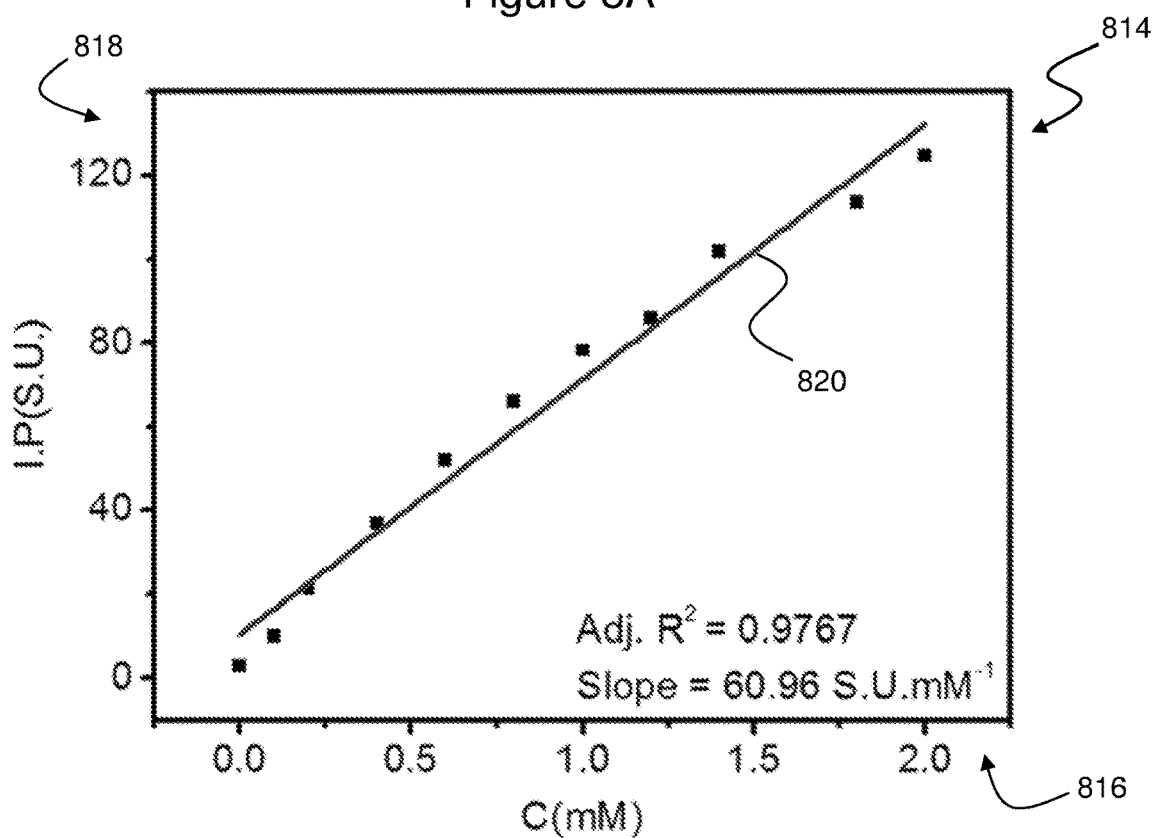

FIGS. 8A and 8B show calibration plots for different resistor values according to embodiments of the invention. The results shown in the graphs have been obtained using a test analyte of ferrocene carboxylic acid (FcCOOH) varying in concentration between zero and approximately 2.0 mM. The voltammetric cell 102 employed a glassy carbon working electrode 104 having a diameter of 1 mm, while the counter-electrode 106 was a coiled silver/silver chloride wire. For the purposes of the two-electrode configuration, it was further ensured that the CE 106 was not smaller in dimensions than the WE 104. The total measurement time (voltage ramp-up and ramp-down) was eight seconds for all measurements, and the AC perturbation frequency was 190 Hz, with amplitude 40 mV. The value of the capacitor 204 was fixed at 4.7 µF.

As will be appreciated by persons skilled in the art of electrochemical analysis, the use of a ferrocene derivative, as in the examples of FIGS. 8A and 8B, is not intended to be limiting. Rather, it will be apparent that any electroactive moiety may be similarly detected. For example, embodiments of the invention may be employed to detect the products or reactants of enzyme substrate reactions, in the context of an enzyme based biosensor. Furthermore, it is common to use ferrocene derivatives as labels in bioanalytical methods such as immunoassays and DNA-based detection.

FIG. 8A shows results for a value of the resistor 202 of 390Ω. The horizontal axis 802 is concentration of the analyte, while the vertical axis 804 is the final IP in arbitrary units. Two separate graphs are shown, the upper graph 806 being results up to a concentration of approximately 1.2 mM, while the lower graph 808 shows the full range of results up to 2.0 mM. For the lower ranges of concentration the results 810 are close to linear, with a regression coefficient $R^2$ of 0.98194, and a slope of 179.5/mM. The full-range results 812 show, however, that the linear regime does not extend to higher concentrations. This is because higher concentrations result in the generation of higher voltammetric current, which increases the voltage across the resistor 202, thereby reducing the voltage across the voltammetric cell 102. The resistor 202 thus acts as a parasitic element in the circuit, suppressing oxidation and associated voltammetric current. It is therefore expected that a lower resistor value will provide for a wider linear dynamic range, at the expense of lower sensitivity (i.e. reduced slope), due to the corresponding reduction in measurement voltage across the resistor 202.

These predictions are borne out in the graph 814 shown in FIG. 8B, for which the resistor value was reduced to 100Ω. Again, the horizontal axis 816 is concentration, and the vertical axis 818 is IP. The results 820 show substantial linearity across the full concentration range, with a regression coefficient $R^2$ of 0.9767. However, the slope is reduced to 61/mM.

It was further found in these tests that the lower limit of detection of presence of the analyte was at a concentration of 50 µM, based on a signal-to-noise ratio of 2.0.

As will be appreciated, measurements such as those represented in FIGS. 8A and 8B may be used for calibration purposes. Within the linear regime, it is sufficient to determine a single calibration constant, namely the slope of the linear relationship between concentration and IP. A voltammetric apparatus may be operated outside the linear regime by retaining the full calibration data, and/or by fitting a high-order function to the nonlinear results.

In summary, in accordance with embodiments of the invention, widely available and relatively low-cost hardware, such as a smartphone or other mobile computing device, with suitable application software installed, can provide the basic functions of a potentiostat for applying an excitation potential to a voltammetric cell to cause electrolysis of redox-active molecules. A simple circuit, comprising a resistor and a capacitor, can be used to measure the resulting current, and the effects of an AC perturbation in the applied potential waveform detected via a standard audio input of the mobile computing device. Second harmonic analysis of the detected signal, either on the mobile computing device itself, or on a PC or server platform to which the results are uploaded, may be employed to determine, e.g. concentration of the analyte. Display and/or further analysis of the second harmonic voltammogram are also possible.

When combined with other low-cost components, such as screen-printed electrodes, embodiments of the invention create new opportunities for low-cost, instrument-free sensing, with important implications for healthcare within the developing world, remote communities, and other circumstances in which ready access to scientific testing equipment or facilities may not be available. Advantageously, mobile communications and computing devices, such as smartphones, also have the capability of transmitting results directly to remote locations, such as storage servers, or desktop computers of medical practitioners.

While various features of embodiments of the invention have been described, further variations and modifications will be apparent and within the ordinary capabilities of a person skilled in the relevant art. Accordingly, the embodiments, features, and specific configuration disclosed above should not be considered limiting of the scope of the invention, which is as defined in the following claims.

The invention claimed is:

1. A mobile voltammetric analysis system for conducting electrochemical analysis of an analyte, the system comprising:
    a mobile computing device;
    a voltammetric cell for receiving a sample of the analyte, and comprising first and second electrodes; and
    a circuit configuration comprising a resistor and a capacitor for connecting the mobile computing device to the voltammetric cell,
    wherein the mobile computing device comprises:
    a microprocessor;
    one or more memory components comprising a program and data store accessible to the microprocessor; and
    an audio interface comprising an audio signal output having first and second channels and an audio signal input, which is operable under control of the microprocessor, wherein the audio interface is connectible, in use, to the voltammetric cell with the first channel of the audio signal output being connected to the first electrode, the second channel of the audio signal output being connected to the second electrode via the resistor, and the audio signal input being connected to the second electrode via the capacitor; and
    the program and data store containing instructions which, when executed by the microprocessor, cause the mobile computing device to implement steps of:
    generating an output voltage waveform between the first and second channels of the audio signal output, the output voltage waveform comprising a time-varying voltammetric driving potential and an AC perturbation;

simultaneously with generating the output voltage waveform, capturing an input voltage waveform received at the audio signal input; and recording within the data store the input voltage waveform as a voltammetric response waveform indicative of a characteristic of the analyte.

2. The system of claim 1 wherein the instructions cause the mobile computing device to generate the output voltage waveform by:

generating a first waveform comprising the voltammetric driving waveform;

generating a second waveform comprising an inverse of the voltammetric driving waveform;

superimposing the AC perturbation to one of the first and second waveforms; and applying the first waveform to the first channel of the audio signal output, and the second waveform to the second channel of the audio signal output.

3. The system of claim 1 wherein the instructions cause the mobile computing device to generate the output voltage waveform in which the voltammetric driving potential is a triangle wave.

4. The system of claim 1 wherein the resistor has a value in the range 47Ω to 4.7 kΩ, more particularly in the range 68Ω to 390Ω, and more particularly around 100Ω.

5. The system of claim 1 wherein a frequency of the AC perturbation is in the range 50 Hz to 500 Hz, more particularly in the range 100 Hz to 400 Hz, and more particularly in the range of around 200 Hz to around 300 Hz.

6. The system of claim 5 wherein the frequency of the AC perturbation is not 50 Hz, or any multiple of 50 Hz, and/or is not 60 Hz, or any multiple of 60 Hz.

7. The system of claim 1 wherein an amplitude of the AC perturbation, relative to a peak output voltage, is in the range 0.7 percent to 7 percent, and more particularly around 3 percent to around 5 percent.

8. A method of AC voltammetric analysis of an analyte in a voltammetric cell, the method comprising:

providing a mobile voltammetric analysis system according to claim 1;

connecting, to the voltammetric cell, the mobile computing device using the circuit configuration such that the first channel of the audio signal output is connected to the first electrode of the voltammetric cell, the second channel of the audio signal output is connected to the second electrode of the voltammetric cell via the resistor, and the audio signal input is connected to the second electrode of the voltammetric cell via the capacitor;

the mobile computing device:

generating an output voltage waveform between the first and second channels of the audio signal output, the output voltage waveform comprising a time-varying voltammetric driving potential and an AC perturbation;

simultaneously with generating the output voltage waveform, capturing an input voltage waveform received at the audio signal input;

recording the input voltage waveform as a voltammetric response waveform within the data store; and performing a second harmonic analysis of the voltammetric response waveform to obtain a corresponding voltammogram indicative of a characteristic of the analyte.

9. The method of claim 8 wherein performing the second harmonic analysis comprises filtering a second harmonic waveform from the AC perturbation, and obtaining the voltammogram as an envelope of the filtered second harmonic waveform.

10. A computer program product comprising a computer-readable medium upon which instructions are recorded that are executable by a mobile computing device connectable to a voltammetric cell via a circuit configuration, the voltammetric cell for receiving a sample of the analyte, and comprising first and second electrodes, the circuit configuration comprising a resistor and a capacitor for connecting the mobile computing device to the voltammetric cell, and the mobile computing device having a microprocessor, one or more memory components comprising a program and data store accessible to the microprocessor, and an audio interface which comprises an audio signal output having first and second channels and an audio signal input, wherein the audio interface is operable under control of the microprocessor, and is connectible, in use, to the voltammetric cell with the first channel of the audio signal output being connected to the first electrode, the second channel of the audio signal output being connected to the second electrode via the resistor, and the audio signal input being connected to the second electrode via the capacitor, the instructions being configured such that, when executed by the microprocessor, the mobile computing device is caused to implement steps of:

generating an output voltage waveform between the first and second channels of the audio signal output, the output voltage waveform comprising a time-varying voltammetric driving potential and an AC perturbation;

simultaneously with generating the output voltage waveform, capturing an input voltage waveform received at the audio signal input; and recording within the data store the input voltage waveform as a voltammetric response waveform indicative of a characteristic of the analyte.

11. The system of claim 1 wherein the characteristic of the analyte is a concentration of the analyte.

12. The method of claim 8 wherein the characteristic of the analyte is a concentration of the analyte.

* * * * *